United States Patent
Häkkinen et al.

(10) Patent No.: US 6,567,459 B1
(45) Date of Patent: May 20, 2003

(54) POWER CONTROL IN MOBILE COMMUNICATIONS SYSTEM

(75) Inventors: Hannu Häkkinen, Espoo (FI); Harri Holma, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/436,450

(22) Filed: Nov. 8, 1999

Related U.S. Application Data

(63) Continuation of application No. PCT/FI98/00416, filed on May 15, 1998.

(30) Foreign Application Priority Data

May 16, 1997 (FI) .................................................. 972107

(51) Int. Cl.$^7$ ................................................ H04B 1/69
(52) U.S. Cl. ...................... 375/132; 375/138; 370/345; 455/522; 455/562
(58) Field of Search ................................. 375/132, 133, 375/135, 136, 138; 370/345, 347; 455/101, 69, 522, 562

(56) References Cited

U.S. PATENT DOCUMENTS 5,450,035 A    9/1995   Kinoshita

FOREIGN PATENT DOCUMENTS

| EP | 0610030 | 8/1994 | |
| EP | 0652648 | 5/1995 | |
| EP | 0668665 | * 8/1995 | ........... H04B/7/005 |

* cited by examiner

Primary Examiner—Lee Nguyen
(74) Attorney, Agent, or Firm—Squire, Sanders & Dempsey L.L.P.

(57) ABSTRACT

The invention relates to a power control method in a mobile communications system in which transmission of a signal of one logical connection over the radio path employs hopping, such as frequency hopping, antenna hopping or timeslot hopping. According to the present invention, the method is characterized in that the quality of the signal received on the radio connection is determined on one hopping setting, such as frequency, antenna or timeslot, and the power control is carried out on the radio connection in question from hopping setting to hopping setting so that the transmission power of at least one hopping setting, such as frequency, differs from the transmission power of at least one other hopping setting, such as frequency, used on the same radio connection.

23 Claims, 4 Drawing Sheets

POWER CONTROL IN MOBILE COMMUNICATIONS SYSTEM

This is a continuation of Application No. PCT/F198/00416 filed May 15, 1998.

FIELD OF THE INVENTION

The present invention relates to a power control method in a mobile communications system employing a hopping scheme on the radio connection. The invention further relates to a mobile communications system.

BACKGROUND OF THE INVENTION

FIG. 1 in the accompanying drawing shows a simplified block diagram of the UMTS (Universal Mobile Telecommunication System). A mobile station (MS) communicates over the radio path with a base transceiver station (BTS), in the case of FIG. 1, with BTS1. The base station sub-system (BSS) consists of a base station controller (BSC) and base stations (BTS) under its control. A mobile services switching centre (MSC) usually controls a plurality of base station controllers BSC. The MSC communicates with other MSCs, and via a gateway mobile services switching centre, the UMTS network is connected to other networks such as the public switched telephone network PSTN, another mobile communications network PLMN or an ISDN network. The UMTS system is proposed to be implemented with the time division multiple access technique (TDMA) or with the code division multiple access technique (CDMA) or a combination of these two, i.e. a so-called hybrid system.

In digital radio systems implemented with the TDMA technique, such as the UMTS system, a group of mobile stations MS may, according to the time-division principle, use the same carrier frequency i.e. radio channel for communication with the base station BTS. The carrier is divided into successive frames that are further divided into timeslots, e.g. 8, 16 or 64 timeslots that are allocated to users as required. One frame lasts for 4.615 ms, which means that, in the case of eight timeslots, one timeslot lasts for 577 µs. From the network point of view, one carrier may be used for establishing, for example, eight traffic channels.

Instead of duplex transmission implemented on two carrier frequencies, digital time-division radio systems may also carry time-division duplexing (TDD) transmission on one frequency. In such a case, at least one of the timeslots in the frame is assigned solely for uplink transmission and at least one for downlink transmission. The other timeslots in the frame are used, as need be, for either the uplink or the downlink communication.

Code division multiple access CDMA radio systems are based on spread spectrum communication. The data signal to be transmitted is multiplied by a special hash code assigned to the subscriber, whereby the transmission spreads out onto the broadband radio channel. This means that the same broadband radio channel may be used by several users for simultaneous transmission of CDMA signals processed with different hash codes. At the receiving end, the CDMA signal is despread by the subscriber's hash code, whereby a narrow-band data signal is obtained. At the receiver, the other subscribers' broadband signals represent noise by the desired signal. Therefore, the unique hash code of each subscriber in CDMA systems produces the traffic channel of the system in the same sense as the timeslot does in TDMA systems.

In mobile communications systems, the mobile station MS and/or the base station BTS carry out transmission power control to reduce the noise level in the network and to compensate for fading on the radio path. Power control usually aims at maintaining the received signal at almost the same, as low as possible a power level while maintaining the quality of the received signal. If the signal quality and/or level on the radio connection between the mobile communications network and the mobile station falls below the desired level, the transmission power may be adjusted at the base station BTS and/or the mobile station MS to improve the radio connection. The transmission power of the mobile station MS is usually adjusted from the fixed network by means of a special power control algorithm. The mobile station MS measures the received level (field strength) and the quality of the downlink signal received from the base station BTS1 of the serving cell, and the base station BTS1 of the serving cell, for its part, measures the received level (field strength) and quality of the uplink signal received from the mobile station MS. On the basis of these measurement results and power control parameters set, the power control algorithm determines a suitable transmission power level, which is then sent to the mobile station MS in a power adjustment command. Power control is continuously carried out during the call. In prior art TDMA systems, such as the GSM system, this typically takes place twice a second. An increase in the transmission power adds to the interference level in the network, which is why the aim is to keep transmission power levels as low as possible. Power control at the mobile station additionally contributes to reducing the power consumption of the mobile station.

Due to fading caused by reflections and multipath propagation of the signal transferred over the radio path, the amplitude of the received signal varies. In TDMA systems, particularly, fading makes signal transfer more difficult. To annul effects of fading, mobile communications systems employ not only power control but also, for example, frequency hopping and/or antenna hopping. The annulling effect of frequency hopping against fading is based on fading being frequency dependent. In antenna hopping, the transmission path of the signal changes, whereby the fading on the signal varies.

With the aid of frequency hopping, it is possible to reduce the co-channel interference caused by various base station signals, and effects on the signal to be transferred of fading on the radio path. In such a case, the frequency used on the radio connection is changed according to a predetermined frequency hopping pattern. Frequency hopping may be carried out as either baseband frequency hopping or transmitter-specifically as changes in the radio frequency. As shown by FIG. 2 of the accompanying drawings, hopping is usually carried out in periods of one burst (timeslot). FIG. 2 shows an example of frequency hopping on four radio frequencies on the radio connection between a mobile communications network and a mobile station. According to the hopping scheme of the figure, the successive bursts of the signal are transmitted on the frequency F4, F2, F3, F1, F2, F3, F4, F2, F3, etc.

It is additionally possible to reduce the effects of fading on the signal to be transmitted by means of antenna hopping, in which the signal is transmitted and/or received alternately via two or more antennas that are located physically apart. In such an event, the propagation path of the signal is different to each antenna. As fading is not only dependent on frequency but also on place, the changes in the propagation path may result in better propagation conditions. In antenna hopping, the transmitting and/or receiving antenna is changed according to a pre-set hopping pattern.

In TDMA systems, the received signal quality can also be improved with timeslot hopping, in which the signal is transferred on the radio connection in successive frames of the same carrier in a different timeslot according to a timeslot hopping pattern. Timeslot hopping effectively reduces short-time, periodic interference to the signal to be transferred, such as that caused by radio signals from other subscribers transmitting in the same timeslot. FIG. 3 shows an example of timeslot hopping when the signal is transmitted in successive frames in timeslot 1, 4, 0, 6, 1, 4, etc.

When transmitting speech or data in a digital communications system, transmission errors are developed on the transmission path that deteriorate the quality of the transmitted signal. Transmission errors are produced on the radio path when the signal becomes distorted e.g. due to multipath propagation, a interfering signal, or a high level of background noise. Error correction, such as channel coding or retransmission, and bit interleaving of the transmitted digital signal improve the transmission quality and tolerance for transmission errors. In channel coding, redundant information is added to the data to be transmitted, by means of which the original data may be detected without errors at the receiver even though the signal gained errors on the transmission path. Retransmission is employed for correction of transmission errors either independently or as an addition to e.g. channel coding, in which case the errors of a channel-coded transmission are corrected by re-transmitting the corrupted frames. In the interleaving of bits to be transmitted, the bits in several code words are mixed with one another whereby the adjacent bits of the signal are spread out to several bursts. Due to interleaving, the signal can in most cases still be detected even though an entire burst were lost during the transmission.

The problem with the prior art power control methods is that the power control is slow, particularly if the radio system employs a hopping method, for example frequency hopping. In frequency hopping, the fading of different frequencies may not correlate, resulting in that power control carried out according to one frequency is not good on the next transmission frequency. In the prior art TDMA systems, e.g. the GSM system, power control is based on average power calculated over several frequency hops and the adjusted transmission power remains the same during a number of bursts, i.e. on various hopping frequencies. A similar problem also occurs with the prior art power control method combined in conjunction with antenna hopping and timeslot hopping.

BRIEF SUMMARY OF THE INVENTION

It is an object of the present invention to implement fast power control in a mobile communications system that employs a hopping technique.

This new type of power control is achieved with the method according to the invention, characterized by that which is disclosed in the independent claims 1, 8 and 15. The specific embodiments of the invention are disclosed in the dependent claims.

The invention further relates to a mobile communications system which, according to the invention, is characterized by that which is claimed in the independent claims 21, 22 and 23.

The invention is based on the idea that power control is advantageously carried out in synchronization with the hopping scheme employed on the radio connection and the transmission power is adjusted to suit each value set by means of the hopping, such as each hopping frequency, antenna, and timeslot. Power control is advantageously carried out based on the quality of the transmitted/received signal, set as a result of the previous, same hopping value, for example on the basis of the quality of the previous signal transmitted on the same hopping frequency, antenna and/or timeslot, or on the basis of the quality of the signal transmitted with the previous hopping value. In the first implementation of the invention, the aim is to amplify a faded or otherwise attenuated signal by increasing the transmission power, and in the second implementation of the invention, the aim is to amplify all other signals but the faded or otherwise attenuated signal by increasing their transmission power, with the power wasted in the faded or otherwise attenuated signal being minimized e.g. by reducing its transmission power.

Such a power control method provides the advantage that the transmission power required can effectively be minimized, whereby, when implemented in a mobile station, the power consumption of the mobile station is reduced.

The inventive method provides the further advantage of a lower overall level of interference in the network.

BRIEF DESCRIPTION OF THE DRAWINGS

Below, the invention will be described in closer detail in connection with the preferred embodiments, referring to the accompanying drawings in which.

DETAILED DESCRIPTION OF THE INVENTION

Figure 1:
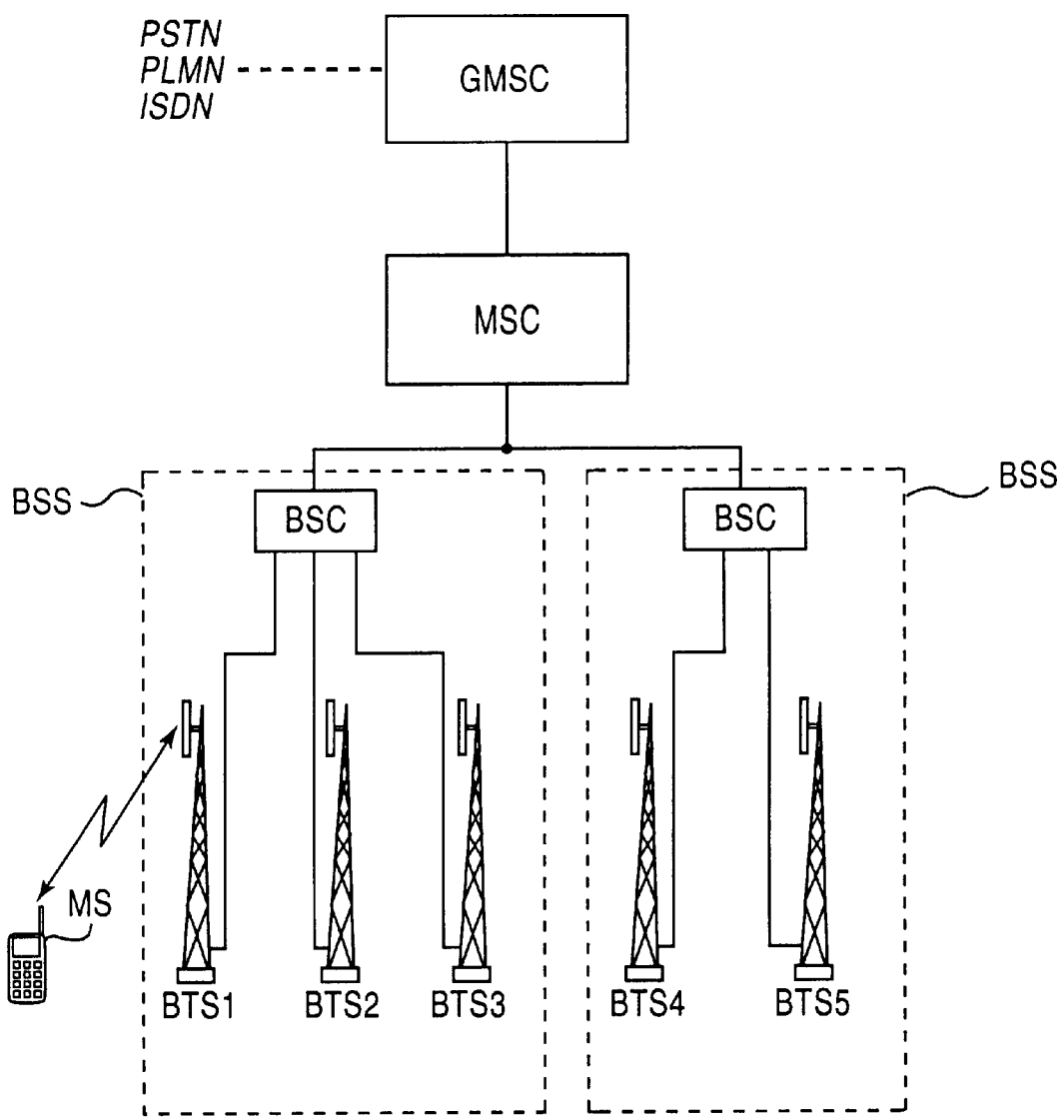
FIG. 1 illustrates the essential parts of a mobile communications network from the point of view of the invention.

The present invention is applicable to any mobile communications system. Below, the invention is described in closer detail mainly in association with the UMTS mobile communications system. FIG. 1 shows the simplified structure of the UMTS network, described in the above.

Figure 2:
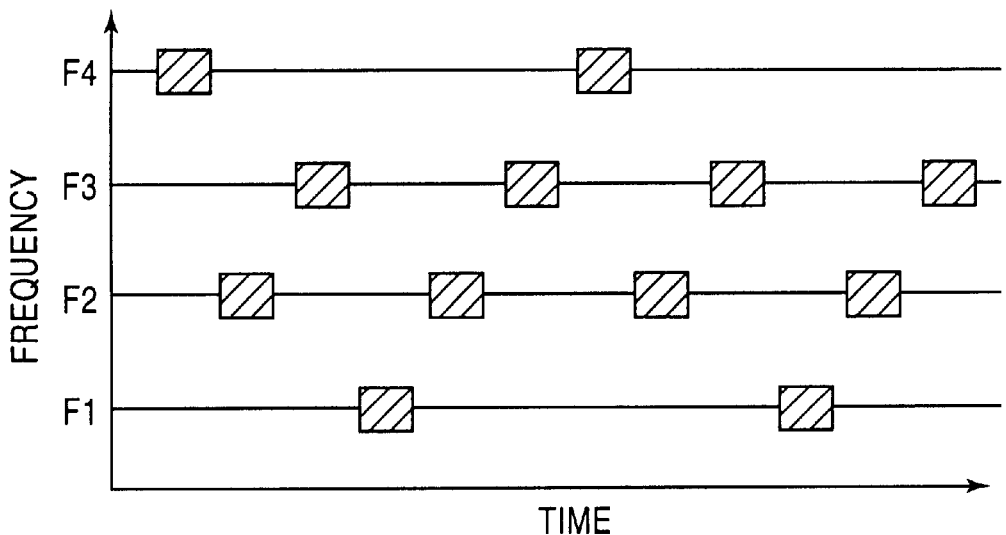
FIG. 2 shows an exemplary case of a frequency hopping pattern of a radio connection as a function of time.
Figure 3:
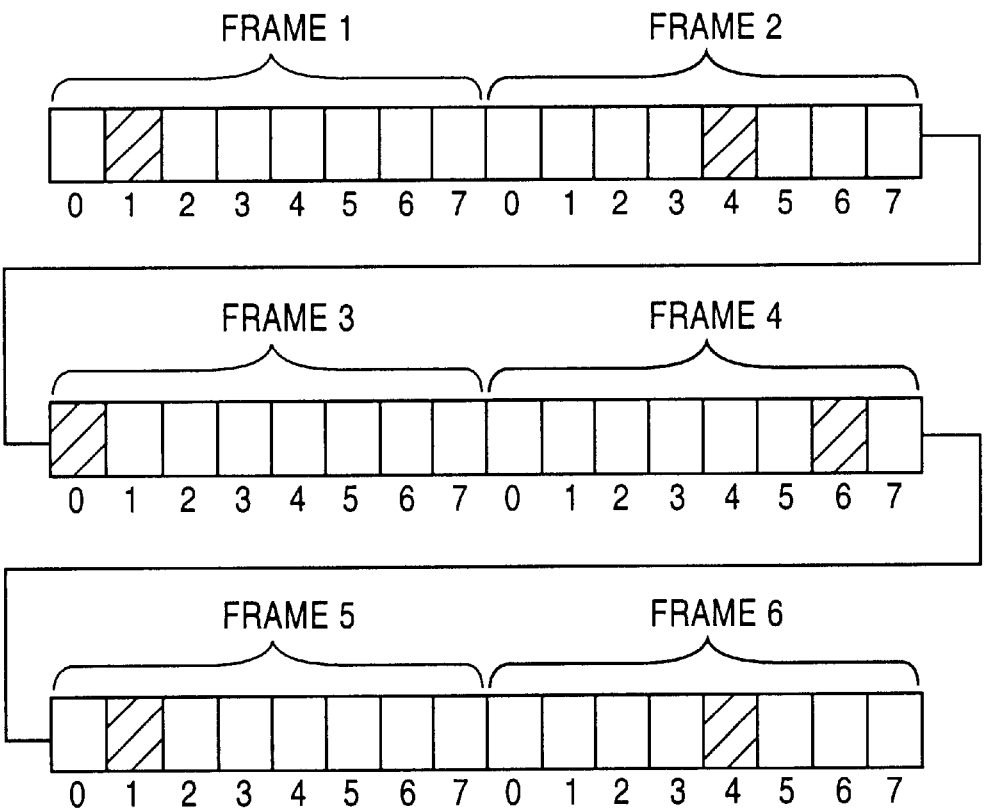
FIG. 3 shows an exemplary case of a timeslot hopping pattern on a radio connection in a TDMA system.
Figure 4:
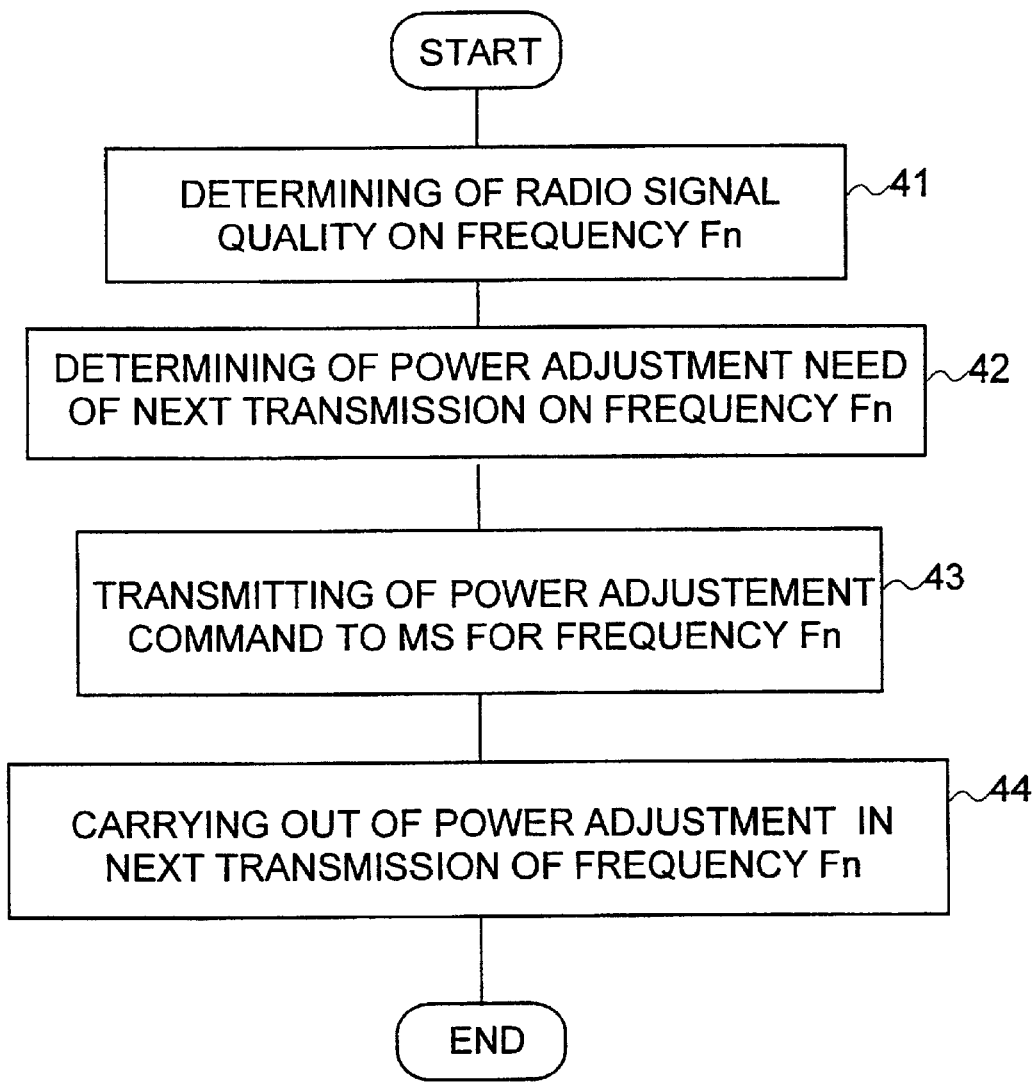
FIG. 4 shows in flow chart form the first embodiment of the method according to the invention.

In the following, the invention will be described in closer detail in connection with its first embodiment, referring to FIG. 4. In the first embodiment of the invention, the mobile communications system employs frequency hopping and the inventive power control. Frequency hopping is carried out, for example, in accordance with the hopping pattern of FIG. 2. FIG. 4 describes, by way of example, the power control method according to the invention by means of power control performed in the mobile station MS.

At step 41 of FIG. 4, the quality of the mobile station signal received at the base station is determined on one frequency Fn. In the TDMA radio system when hopping takes place in periods of one timeslot, the quality of the signal is determined in one timeslot on a specific frequency Fn. The signal quality is determined based on the received signal strength, carrier to interference ratio C/I, or the received interference level, for example. The interference level is advantageously determined by averaging the interference level measured from all the frequencies or transmissions on one frequency.

The power adjustment need on frequency Fn is determined at step 42 on the basis of the quality of this signal, e.g. by means of one of the methods to be described more fully below. At step 43 of FIG. 4, the power adjustment need determined above on frequency Fn is adapted into a power adjustment command that is transmitted to the mobile station MS. Based on the power adjustment command received, the MS adjusts its transmission power advantageously at the next transmission of frequency Fn. The functionality of steps 41–44 is advantageously carried out for all transmission frequencies taking part in the hopping.

In the first implementation of the first embodiment of the invention, the determining of the power adjustment need carried out at step 42 of FIG. 4 is implemented by comparing, for example, the received signal strength to a pre-set reference value. The received signal is weak on account of strong fading and high propagation attenuation, whereby a power adjustment command is issued at step 43 in the first implementation to increase the transmission power. If the fading and the propagation attenuation are minor and the signal consequently strong in comparison to the reference value, a power adjustment command is given at step 43 to reduce the transmission power.

In the second implementation of the first embodiment of the invention, the power adjustment need is determined similarly e.g. by comparing the received signal strength to a pre-set reference value. However, the power adjustment command is given so that a signal which has faded out strongly on one frequency is compensated for by transmitting a power adjustment command to increase the transmission power on the other frequencies, and possibly a power adjustment command to reduce the transmission power of the faded frequency. Due to error correction and interleaving, the signal is probably still detectable despite a possible transmission loss of one burst, i.e. timeslot, on one frequency. Thus, the transmission power of each burst in the second implementation is adjusted on the basis of the quality of the previous burst received on this frequency and the received power level of the other hopping frequencies used. This implementation provides the advantage of maintaining a lower total transmission power and consequently a lower overall interference level in the network than in case attempts were made to amplify the faded frequency by increasing the transmission power. Additionally, the second implementation provides the advantage that the overall power level received is increased as a result of amplifying strong signals, as shown by the example of Table 1. In the example of Table 1, the power received (1) consists of the product of the transmission power and channel amplification. Similarly, the power received (2) can be obtained as the product of the adjusted transmission power and channel amplification formed on the basis of power control according to the second implementation of the first embodiment of the present invention.

TABLE 1

| | transmission power | adjusted transmission power | channel amplification | received power (1) | received power (2) |
|---|---|---|---|---|---|
| f1 | 1.0 | 0.1 | 0.1 | 0.1 | 0.01 |
| f2 | 1.0 | 1.0 | 1 | 1.0 | 1.0 |
| f3 | 1.0 | 2.0 | 2 | 2.0 | 4.0 |
| total power | 3.0 | 3.1 | | 3.1 | 5.01 |

When the first embodiment of the invention is applied to power control of a base station transmission, the quality of the radio signal and thus the power adjustment need are determined e.g. on the basis of the quality of the uplink signal measured at the base station or on the basis of the downlink signal quality measured at the mobile station, which the mobile station MS normally conveys to the serving base station in the measurement reports according to prior art. The functionality of step 43 in FIG. 4 is not required in the base station power control according to the invention.

Figure 5:
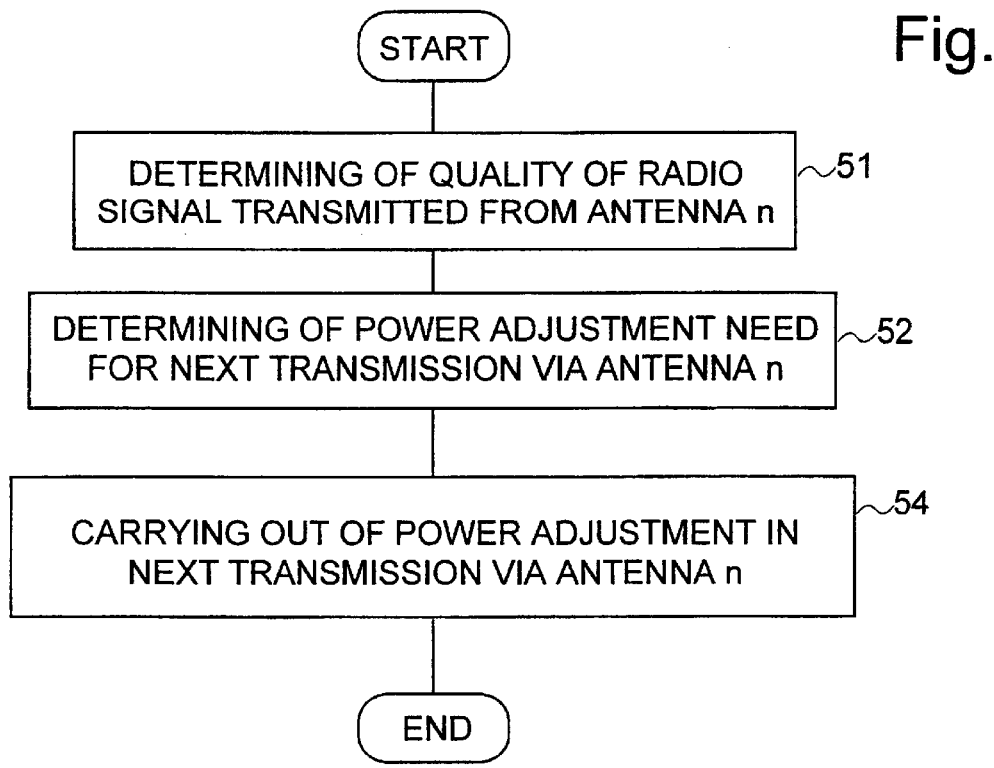
FIG. 5 shows in flow chart form the second embodiment of the method according to the invention

FIG. 5 is a flow chart representation of the power control method according to the second embodiment of the invention. According to the second embodiment of the invention, the mobile communications system employs antenna hopping and the inventive power control. Antenna hopping is advantageously carried out at the base station BTS, and therefore the second embodiment is described in the light of power control of a base station transmission.

At step 51 of FIG. 5, the quality of a signal transmitted via antenna 1 of the base station BTS is determined at the mobile station MS, for example the received signal strength, carrier to interference ratio C/I, or the received interference level. The mobile station MS transmits the measurement results in a measurement report to the base station BTS which, based on these measurement results, determines the need for power adjustment of the next transmission from antenna 1 (step 52). At step 54, the transmission power of the signal to be next transmitted via antenna 1 is adjusted according to the determined power adjustment need. In the first implementation, power control is carried out by reducing the transmission power of the signal to be next transmitted via antenna 1, in case the signal transmitted via antenna 1 was received at the mobile station as a strong signal, and in case of a weak receive level, the transmission power is increased for the next transmission from antenna 1. In the second implementation of the second embodiment, power control is carried out as follows: in case of poor receive quality, the transmission power of signals to be next transmitted via the antenna that had transmitted the signal in question is not changed and the transmission power of signals to be transmitted via the other antennas is increased, or the power of signals to be next transmitted via the antenna that transmitted the signal in question is reduced and the transmission power of signals to be transmitted via the other antennas is increased. The advantages of the second embodiment correspond to those described above in connection with the second implementation of the first embodiment of the invention. The procedures according to steps 51–54 are also carried out for the other antennas taking part in the antenna hopping whereby power adjustment of the signal is individually adapted to each transmission antenna when transmission takes place via the antenna in question.

The first and second embodiments of the invention, described above, can also be combined when the mobile communications system employs both frequency and antenna hopping. However, for the power control according to the invention to work properly, both the hoppings must be carried out in synchronization and with an equally long hopping pattern.

Figure 6:
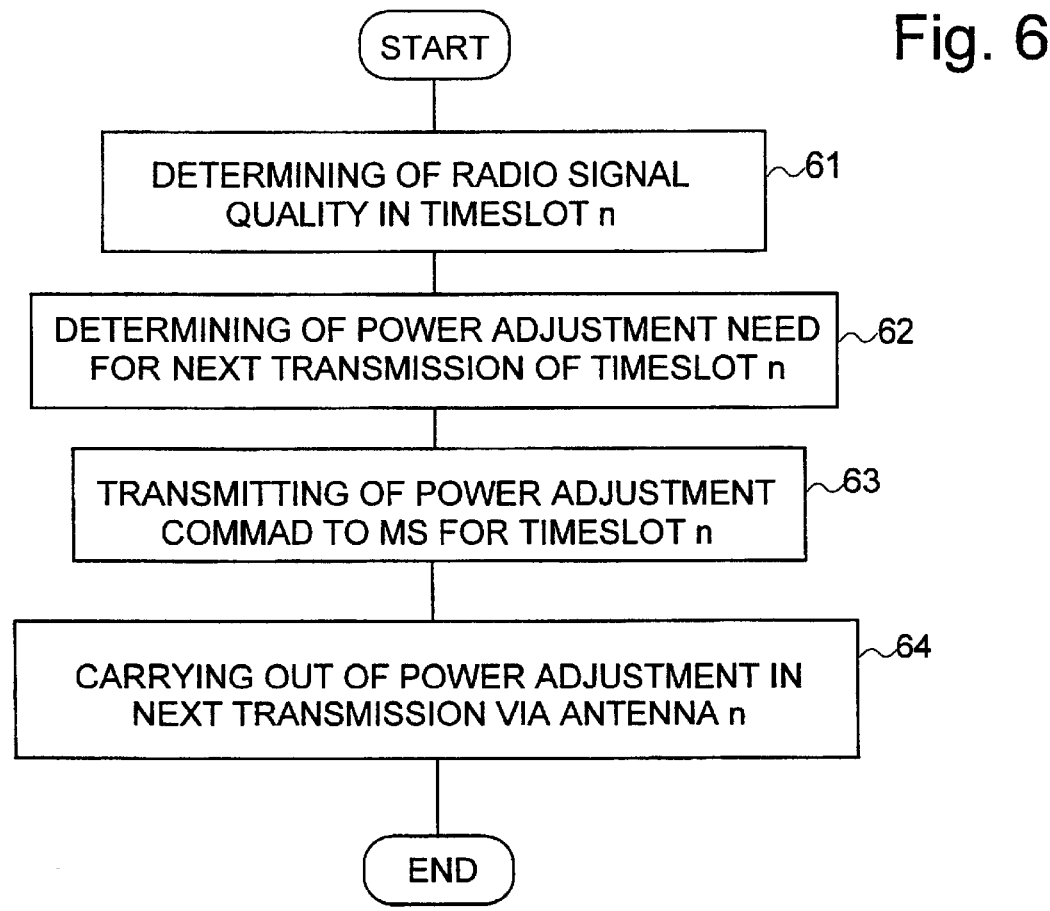
FIG. 6 shows in flow chart form the third embodiment of the method according to the invention

FIG. 6 is a flow chart illustration of the third embodiment of the power control method according to the invention. In the third embodiment of the invention, the mobile communications system employs timeslot hopping and the inventive power control. FIG. 6 shows, by way of example, how the power control is carried out at the mobile station MS. As described above in connection with the first embodiment, the functionality according to the third embodiment of the invention may also be implemented in the power control of a base station transmission, which means that there is no need to transmit a power adjustment command.

At step 61 of FIG. 6, the quality of the radio signal transmitted by the mobile station MS and received at the base station BTS is determined in the received timeslot n, for example by measuring the received signal strength, carrier to interference ratio C/I or the received interference level. On the basis of the quality of the received radio signal, the base station BTS determines the power adjustment need of the next signal to be transmitted in timeslot n in question (step 62). At step 63, the base station BTS transmits a power adjustment command to the mobile station MS to adjust the power level of the next transmission in timeslot n. At step 64 the mobile station MS carries out the power adjustment according to the power adjustment command for transmission in timeslot n. In the first implementation, for example, the power adjustment need is determined by issuing a power adjustment command to increase the transmission power in timeslot n in case the signal quality determined at step 61 is poor, and in the second implementation by issuing a power adjustment command to increase the transmission power in all the timeslots except for timeslot n and possibly to reduce the transmission power in timeslot n when the signal quality determined at step 61 is poor. The second implementation works similarly to what has been described above in connection with the second implementation of the first embodiment. The functionality of steps 61–64 is advantageously carried out for all the timeslots taking part in the hopping.

The power control method according to the present invention is also applicable for use in a time-division multiplex TDD system that employs frequency hopping and/or antenna hopping. In such a case it is possible to arrange the radio signal quality to be determined, in addition to the above implementations, in the same unit in which the power adjustment is carried out, because both the uplink and the downlink transmission takes place on the same frequency. For example, the quality of the base station signal is measured at the mobile station MS, and based on the quality, a decision on power adjustment is made, and the next transmission, for example a signal to be transmitted on the same hopping frequency, is carried out with the same hopping settings with a power level set on the basis of the power control according to the invention. It is particularly advantageous to determine the quality of the received signal and to make the power adjustment decision in the same unit in mobile communications systems that employ frequency hopping.

With the second implementation of the embodiments of the inventive power control method, it is advantageous to incorporate an adjustment restriction of the transmission power by means of transmitter dynamics in order not to reduce the transmission power endlessly. In one embodiment of the invention, it is possible to set the power control to be revertive so that the aim is to increase a reduced transmission power level in pre-set steps in case the power control method no longer detects any need to lower the transmission power, or in case the transmission power levels in the transmission timeslots differ too much from each other. In such a case, a very weak signal is not continuously attenuated but it is amplified little by little with the aim to balance the transmission power levels.

The power control methods described above that are carried out on the basis of the previous timeslot transmitted with the same settings are particularly well suited to power control of mobile stations MS which move slowly. The power control according to the invention may also be based on the quality of the radio signal in the previous timeslot, particularly in case of mobile stations MS which move fast.

The drawings and the description related thereto are only intended to illustrate the idea of the invention. The inventive power control may vary in details within the scope of the claims. Although the invention is above described mainly in association with a TDMA radio system, the method may be applied to other types of radio systems, such as a TDMA/CDMA hybrid system.

What is claimed is:

1. A power control method in a mobile communications system in which transmission of a signal of one logical connection over the radio path employs frequency hopping whereby the transmission frequency on the radio connection is changed at specific intervals among at least two hopping frequencies, the power control method comprising:

transmitting a signal with a certain transmission power at one of the hopping frequencies from a sending end of the radio connection;

determining at the receiving end of the radio connection, based on the quality of the received signal, power adjustment need for the next transmission at the same hopping frequency;

transmitting a power adjustment command to the sending end of the radio connection; and adjusting at the sending end of the radio connection transmission power of the next transmission at said hopping frequency according to the received power adjustment command, wherein the transmission power is adjusted on said radio connection from hopping frequency to hopping frequency so that the transmission power of at least one hopping frequency used on the radio connection differs from the transmission power of at least one other hopping frequency used on the same radio connection.

2. The power control method according to claim 1, wherein adjusting the transmission power in a timeslot is based on the quality measured in a previous timeslot of the same frequency.

3. The power control method according to claim 1, wherein adjusting the transmission power in a timeslot is based on the quality measured in a previous timeslot.

4. The power control method according to claim 1, wherein the transmission power is only increased on the hopping frequency on which the quality of the received signal was determined, in case the quality determined for the received signal is poor.

5. The power control method according to claim 1, wherein the transmission power is increased on all the other hopping frequencies of the radio connection but the frequency on which the quality of the received signal was determined, in case the quality determined for the received signal is poor.

6. The power control method according to claim 5, wherein the transmission power is reduced on the frequency on which the quality of the received signal was determined.

7. The power control method according to claim 5, further comprising balancing the transmission power differences between the frequencies of the radio connection by increasing a low transmission power level when the difference of the transmission power levels equals the transmitter dynamics.

8. A power control method in a mobile communications system in which transmission of a signal of one logical connection over the radio path employs antenna hopping whereby the antenna used to transmit the radio signal is changed at specific intervals between at least two hopping antennas, characterized in that the method comprises the steps of determining the quality of the signal received on the radio connection for one-antenna, and carrying out power adjustment from hopping antenna to hopping antenna on said radio connection so that the transmission power of transmission from at least one antenna used on the radio connection differs from the transmission power of transmission from at least one other antenna used on the same radio connection.

9. A method according to claim 8, characterized by measuring the received signal quality from timeslot to timeslot, and adjusting the transmission power in the timeslot being dealt with based on the quality measured in the previous one timeslot of the same antenna.

10. A method according to claim 8, characterized by measuring the received signal quality from timeslot to timeslot, and adjusting the transmission power in the timeslot being dealt with based on the quality measured in the previous one timeslot.

11. A method according to claim 8, characterized in that the transmission power is only increased when transmitting via the hopping antenna for which the quality of the received signal was determined, in case the quality determined for the received signal is poor.

12. A method according to claim 8, characterized in that the transmission power on the radio connection is increased when transmitting via all the other hopping antennas but the antenna for which the quality of the received signal was determined, in case the quality determined for the received signal is poor.

13. A method according to claim 12, characterized in that the transmission power is reduced when transmitting via the antenna for which the quality of the received signal was determined.

14. A method according to claim 12, characterized by determining transmission power dynamics for the transmitter, and balancing the transmission power differences transmitted from the antennas of the radio connection by increasing a low transmission power level, in case the difference of the transmission power levels equals the transmitter dynamics.

15. A power control method in a mobile communications system in which transmission of a signal of one logical connection over a radio path employs timeslot hopping whereby the timeslot used to transmit the radio signal is changed at specific intervals between at least two hopping timeslots, the method comprising:

determining a quality of the signal received on the radio connection in one timeslot;

transmitting a power control command to a transmitting end of a radio connection; and based on the power control command, carrying out at the transmitting end power adjustment on said radio connection from hopping timeslot to hopping timeslot so that the transmission power of at least one timeslot used on the radio connection differs from the transmission power of at least one other timeslot used on the radio connection.

16. The power control method according to claim 15, wherein adjusting the transmission power level in a timeslot is based on the quality measured in a previous timeslot.

17. The power control method according to claim 15, wherein the transmission power is only increased in the hopping timeslot in which the quality of the received signal was determined, in case the quality determined for the received signal is poor.

18. The power control method according to claim 15, wherein the transmission power is increased in all the other hopping timeslots of the radio connection but the timeslot in which the quality of the received signal was determined, in case the quality determined for the received signal is poor.

19. The power control method according to claim 18, wherein the transmission power is reduced in the timeslot in which the quality of the received signal was determined.

20. The power control method according to claim 18, further comprising balancing the transmission power differences of the timeslots of the radio connection by increasing a low transmission power level in case the difference of transmission power levels equals the transmitter dynamic.

21. A mobile communications system comprising base stations and mobile stations that communicate over a radio path with the base stations, the mobile communications system employing frequency hopping on the radio connections between the base stations and the mobile station, whereby a transmission frequency is changed at specific intervals among at least two hopping frequencies, the mobile communication system comprising means for adjusting the transmission power levels of one logical connection from hopping frequency to hopping frequency in response to a power control command received from the receiving end of a radio connection so that the transmission power levels of at least two hopping frequencies differ from each other.

22. A mobile communications system comprising base stations (BTS) and mobile stations (MS) that communicate over the radio path with the base stations (BTS), the mobile communications system employing antenna hopping on the radio connection between the base station (BTS) and the mobile station (MS), whereby the signal transfer is changed at specific intervals from antenna to antenna among at least two hopping antennas, characterized in that the mobile communications system is adapted for adjustment of the transmission power levels of one logical connection hopping antenna by hopping antenna so that the transmission power levels of transmissions from at least two hopping antennas differ from each other.

23. A mobile communications system comprising base stations and mobile stations that communicate over a radio path with the base stations, the mobile communications system employing timeslot hopping on the radio connections between the base station and the mobile station, whereby the transmission timeslot is changed at specific intervals among at least two hopping timeslots, the mobile communications system comprising means for adjusting transmission power levels of one logical connection from hopping timeslot to hopping timeslot in response to a power control command received from the receiving end of a radio connection so that the transmission power levels of at least two hopping timeslots differ from each other.

* * * * *